US012770113B2

(12) United States Patent
Allen et al.

(10) Patent No.: US 12,770,113 B2
(45) Date of Patent: Oct. 20, 2026

(54) DISPLAY DURATION ASSIGNMENT FOR EPHEMERAL MESSAGES

(71) Applicant: Snap Inc., Santa Monica, CA (US)

(72) Inventors: Nicholas Allen, Venice, CA (US); Donald Giovannini, Venice, CA (US); Chiayi Lin, Venice, CA (US); Robert Murphy, Venice, CA (US); Evan Spiegel, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 19/576,720

(22) Filed: Mar. 24, 2026

(65) Prior Publication Data

US 2026/0230446 A1 Aug. 6, 2026

Related U.S. Application Data

(63) Continuation of application No. 16/933,279, filed on Jul. 20, 2020, which is a continuation of application
(Continued)

(51) Int. Cl.
*H04L 51/42* (2022.01)
*G06F 3/0482* (2013.01)
(Continued)

(52) U.S. Cl.
CPC ............ *H04L 51/42* (2022.05); *G06F 3/0482* (2013.01); *G06F 3/04847* (2013.01); *G06F 3/04883* (2013.01); *G06F 3/04886* (2013.01); *G06F 16/162* (2019.01); *G06F 16/215* (2019.01); *G06F 16/2365* (2019.01); *G06F 21/62* (2013.01); *G06F 40/169* (2020.01);
(Continued)

(58) Field of Classification Search
CPC ......... H04L 51/42; H04L 51/10; H04L 51/52; H04L 67/568; G06F 3/0482; G06F 3/04847; G06F 3/04883; G06F 3/04886; G06F 16/162; G06F 16/215; G06F 16/2365; G06F 21/62; G06F 40/169; G06Q 10/40
See application file for complete search history.

(56) References Cited

U.S. PATENT DOCUMENTS

2010/0287249 A1* 11/2010 Yigang ................ G06Q 10/107
709/206
2015/0007342 A1* 1/2015 Thorpe ................... G06F 21/10
726/26
(Continued)

OTHER PUBLICATIONS

"U.S. Appl. No. 16/933,279, Examiner Interview Summary mailed Jan. 29, 2026", 2 pgs.
(Continued)

*Primary Examiner* — Austin J Moreau
(74) *Attorney, Agent, or Firm* — Schwegman Lundberg & Woessner, P.A.

(57) ABSTRACT

A server has a processor and a memory storing instructions executed by the processor to maintain an ephemeral gallery of ephemeral messages. An ephemeral message is posted to the ephemeral gallery. The ephemeral message has an associated message duration parameter and a gallery participation parameter. An ephemeral message is removed from the ephemeral gallery in response to the identification of an expired gallery participation parameter.

30 Claims, 10 Drawing Sheets

Related U.S. Application Data

No. 15/224,312, filed on Jul. 29, 2016, now Pat. No. 11,855,947, which is a continuation of application No. 14/505,478, filed on Oct. 2, 2014, now Pat. No. 9,537,811.

(51) Int. Cl.

| | |
|---|---|
| ***G06F 3/04847*** | (2022.01) |
| ***G06F 3/04883*** | (2022.01) |
| ***G06F 3/04886*** | (2022.01) |
| ***G06F 16/16*** | (2019.01) |
| ***G06F 16/215*** | (2019.01) |
| ***G06F 16/23*** | (2019.01) |
| ***G06F 21/62*** | (2013.01) |
| ***G06F 40/169*** | (2020.01) |
| ***G06Q 10/40*** | (2026.01) |
| ***H04L 51/10*** | (2022.01) |
| ***H04L 51/52*** | (2022.01) |
| ***H04L 67/568*** | (2022.01) |

(52) U.S. Cl.

CPC ............. *G06Q 10/40* (2026.01); *H04L 51/10* (2013.01); *H04L 51/52* (2022.05); *H04L 67/568* (2022.05)

(56) References Cited

U.S. PATENT DOCUMENTS

| | | | | |
|---|---|---|---|---|
| 2017/0070870 | A1* | 3/2017 | Brooks | H04W 4/14 |
| 2024/0161155 | A1* | 5/2024 | Fletcher | G06Q 30/02 |

OTHER PUBLICATIONS

"U.S. Appl. No. 16/933,279, Examiner Interview Summary mailed Jul. 28, 2025", 2 pgs.
"U.S. Appl. No. 16/933,279, Final Office Action mailed Jul. 31, 2023", 17 pgs.
"U.S. Appl. No. 16/933,279, Final Office Action mailed Oct. 16, 2025", 21 pgs.
"U.S. Appl. No. 16/933,279, Final Office Action mailed Nov. 7, 2024", 20 pgs.
"U.S. Appl. No. 16/933,279, Non Final Office Action mailed Jan. 23, 2024", 20 pgs.
"U.S. Appl. No. 16/933,279, Non Final Office Action mailed Mar. 25, 2021", 41 pgs.
"U.S. Appl. No. 16/933,279, Non Final Office Action mailed Apr. 21, 2026", 25 pgs.
"U.S. Appl. No. 16/933,279, Non Final Office Action mailed May 2, 2025", 22 pgs.
"U.S. Appl. No. 16/933,279, Response filed Feb. 17, 2026 to Final Office Action mailed Oct. 16, 2025", 16 pgs.
"U.S. Appl. No. 16/933,279, Response filed Apr. 7, 2025 to Final Office Action mailed Nov. 7, 2024", 13 pgs.
"U.S. Appl. No. 16/933,279, Response filed Apr. 23, 2024 to Non Final Office Action mailed Jan. 23, 2024", 15 pgs.
"U.S. Appl. No. 16/933,279, Response filed Aug. 5, 2025 to Non Final Office Action mailed May 2, 2025", 15 pgs.
"U.S. Appl. No. 16/933,279, Response filed Aug. 25, 2021 to Non Final Office Action mailed Mar. 25, 2021", 14 pgs.
"U.S. Appl. No. 16/933,279, Response filed Oct. 26, 2023 to Final Office Action mailed Jul. 31, 2023", 12 pgs.
"U.S. Appl. No. 17/323,702, Response filed May 18, 2026 to Non Final Office Action mailed Dec 16, 2025", 22 pgs.

* cited by examiner 700 702 704

| | | |
|---|---|---|
| Message_1 | 10 Seconds | 120 Minutes Left |
| Message_2 | 5 Seconds | 360 Minutes Left |
| Message_3 | 5 Seconds | 1200 Minutes Left |
| Message_4 | 10 Seconds | 1320 Minutes Left |

FIG. 7

DISPLAY DURATION ASSIGNMENT FOR EPHEMERAL MESSAGES

CROSS-REFERENCE TO RELATED APPLICATION

This application is a continuation of U.S. patent application Ser. No. 16/933,279, filed Jul. 20, 2020, which application is a continuation of U.S. patent application Ser. No. 15/224,312, filed Jul. 29, 2016, now issued as U.S. Pat. No. 11,855,947, which application is a continuation of U.S. patent application Ser. No. 14/505,478, filed Oct. 2, 2014, now issued as U.S. Pat. No. 9,537,811, each of which are incorporated by reference herein in their entireties.

FIELD OF THE INVENTION

This invention relates generally to the display of computer network delivered ephemeral messages. More particularly, this invention relates to an ephemeral gallery of ephemeral messages.

BACKGROUND OF THE INVENTION

Messages (e.g., text, photo or video) delivered over computer networks are well known. However, one problem associated with such messages is that they require an affirmative act on the part of a user to delete or remove messages from their devices once the messages have been viewed or read. As a result, in some instances, users refrain from spontaneously sending many messages for fear of filling or cluttering a recipient's in-box.

In view of the foregoing, it would be desirable to maintain spontaneity and expand communicative content of messaging activity, while reducing the device management burdens imposed upon a message recipient.

SUMMARY OF THE INVENTION

A server has a processor and a memory storing instructions executed by the processor to maintain an ephemeral gallery of ephemeral messages. An ephemeral message is posted to the ephemeral gallery. The ephemeral message has an associated message duration parameter and a gallery participation parameter. An ephemeral message is removed from the ephemeral gallery in response to the identification of an expired gallery participation parameter.

BRIEF DESCRIPTION OF THE FIGURES

The invention is more fully appreciated in connection with the following detailed description taken in conjunction with the accompanying drawings, in which:

FIG. 7 illustrates an ephemeral gallery data structure associated with an embodiment of the invention.

Like reference numerals refer to corresponding parts throughout the several views of the drawings.

DETAILED DESCRIPTION OF THE INVENTION

Figure 1:
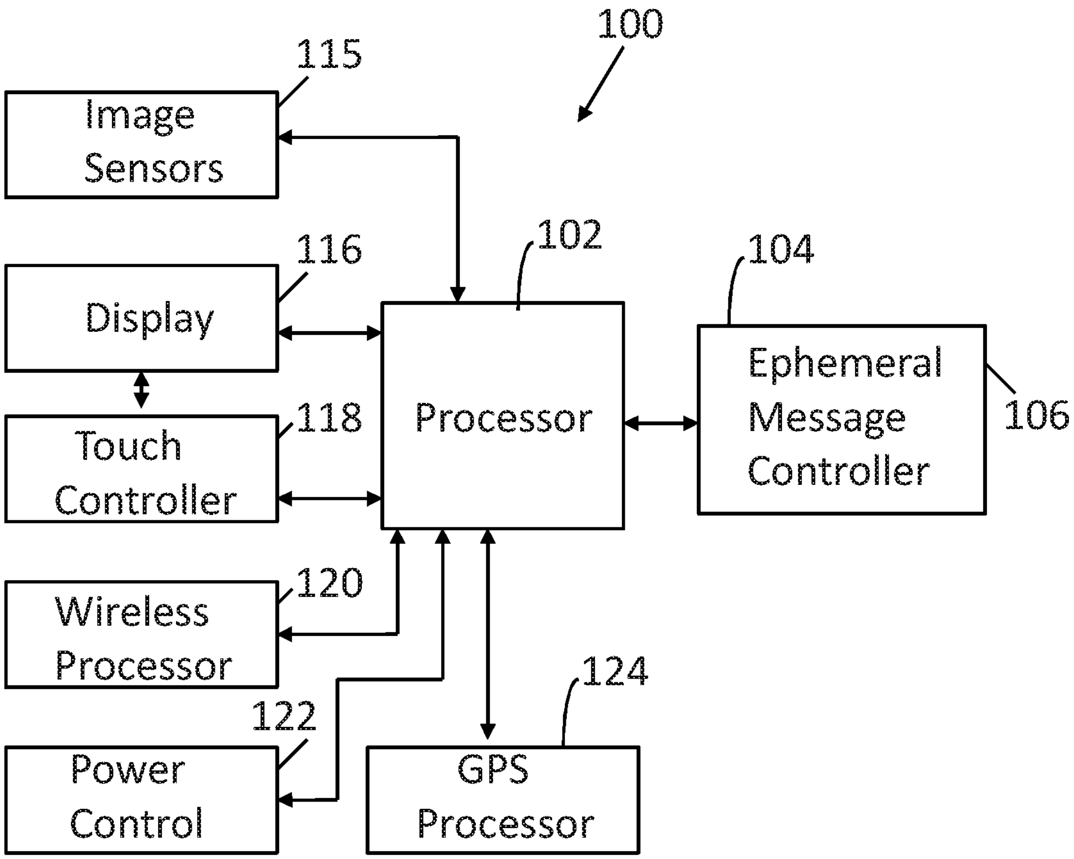
FIG. 1 illustrates components of an electronic device utilized in accordance with the invention.

FIG. 1 illustrates an electronic device 100. In one embodiment, the electronic device 100 is a smartphone with a processor 102 in communication with a memory 104. The processor 102 may be a central processing unit and/or a graphics processing unit. The memory 104 is a combination of flash memory and random access memory. The memory 104 stores an ephemeral message controller 106 to implement operations of the invention. The ephemeral message controller 106 may include executable instructions to access a server which coordinates operations disclosed herein. Alternately, the ephemeral message controller 106 may include executable instructions to coordinate some of the operations disclosed herein, while the server implements other operations.

An ephemeral message may be a text, an image, a video and the like. The display time for the ephemeral message is typically set by the message sender. However, the display time may be a default setting or a setting specified by the recipient. Regardless of the setting technique, the message is transitory (i.e., the message is deleted or otherwise made inaccessible after a certain period of time or after a certain action has been taken).

The processor 102 is also coupled to image sensors 115. The image sensors 115 may be known digital image sensors, such as charge coupled devices. The image sensors capture visual media, which is presented on display 116.

A touch controller 118 is connected to the display 116 and the processor 102. The touch controller 118 is responsive to haptic signals applied to the display 116. In one embodiment, the ephemeral message controller 106 monitors signals from the touch controller 118. If haptic contact is observed by the touch controller 118 in connection with indicia of an ephemeral gallery, then the ephemeral gallery is displayed to the user as a sequence of ephemeral messages.

The electronic device 100 may also include other components commonly associated with a smartphone, such as a wireless signal processor 120 to provide connectivity to a wireless network. A power control circuit 122 and a global positioning system processor 124 may also be utilized. While many of the components of FIG. 1 are known in the art, new functionality is achieved through the ephemeral message controller 106 operating in conjunction with a server.

Figure 2:
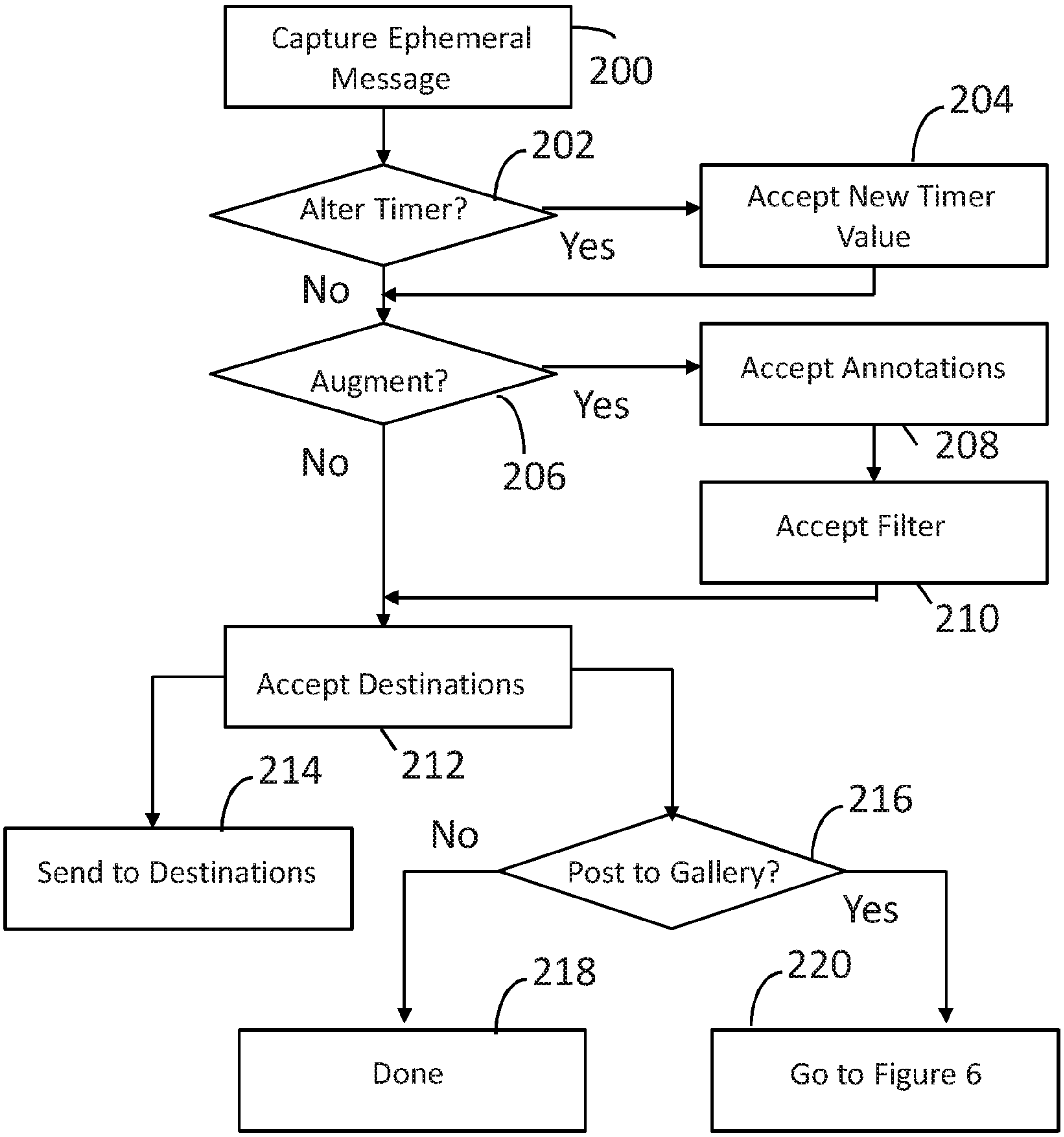
FIG. 2 illustrates processing operations associated with an embodiment of the invention.
Figure 3:
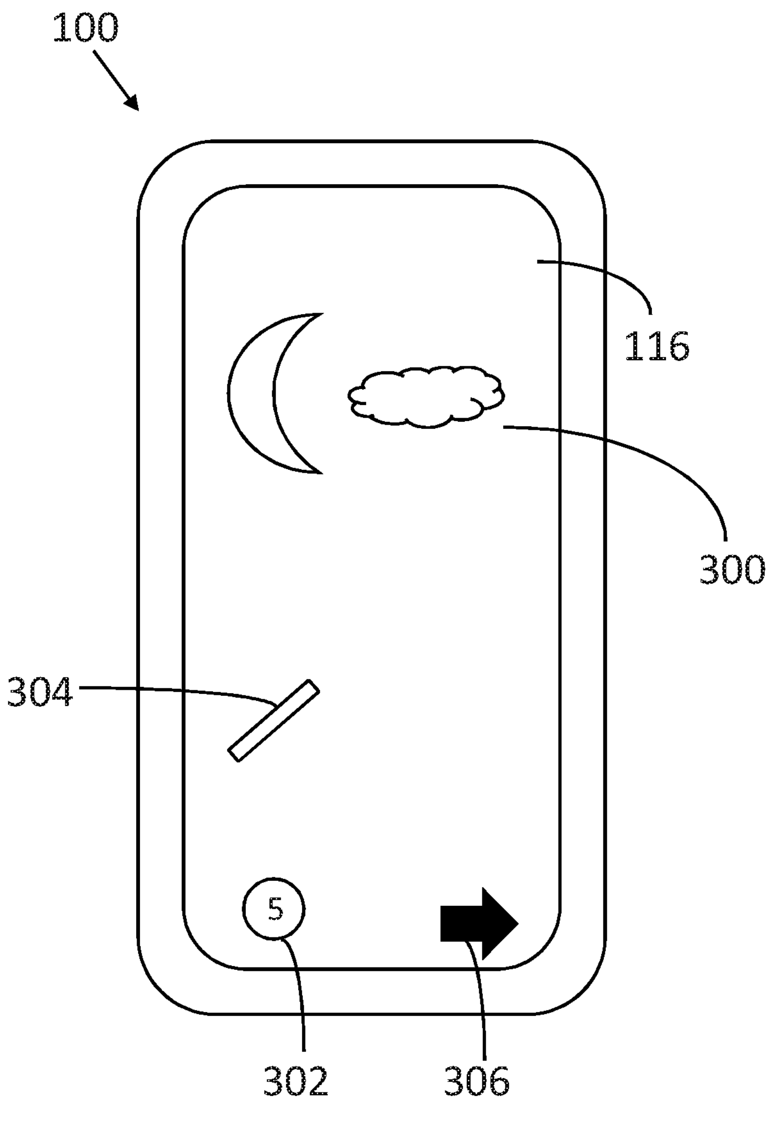
FIG. 3 illustrates an electronic device for capturing and augmenting an ephemeral message.

FIG. 2 illustrates processing operations associated with the ephemeral message controller 106. Initially, an ephemeral message is captured 200. FIG. 3 illustrates electronic device 100 and touch display 116 with a photograph 300 operative as an ephemeral message.

The next processing operation of FIG. 2 is to determine whether to alter a timer or a message duration parameter 202. FIG. 3 illustrates an example of indicia 302 of a message duration parameter. In this example, the indicia indicates a default of 5 seconds as the message duration parameter. If the indicia is engaged (e.g., through haptic contact), then a prompt may be supplied for a new message duration parameter (e.g., 10 seconds). Such activity (202—Yes) results in the acceptance of the new timer value 204. If a new timer value is specified or no alteration of a timer transpires (202—No) control proceeds to block 206. The user may be prompted to augment the ephemeral message. As shown in FIG. 3, a drawing tool 304 may be supplied to allow a user to add a hand drawn message. The drawing tool 304 may be manipulated by haptic contact to enter a message or annotation of visual media. Alternately or in addition, a keyboard may be used to type augment a message. For example, a tap on the touch display 116 may result in a keyboard being displayed, which allows a user to enter a typed message.

As shown in FIG. 2, annotations may be accepted 208 in this manner. Augmentation may also be in the form of photograph filters. That is, photograph filters may be accepted 210. For example, a first right-to-left swipe motion on the touch display 116 may drag a first filter on top of the photograph. A second right-to-left swipe motion on the touch display 116 may drag a second filter on top of the photograph. Filter processing of this type is described in commonly owned U.S. Ser. No. 14/325,270, filed Jul. 7, 2014, the contents of which are incorporated herein by reference.

Figure 4:
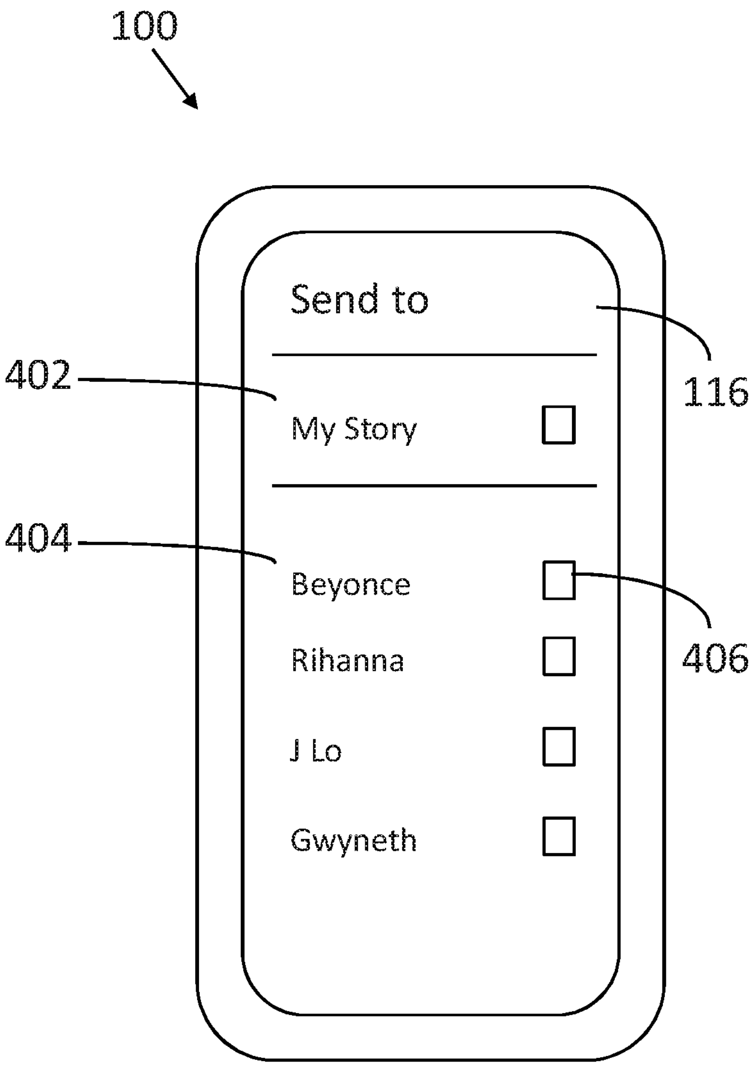
FIG. 4 illustrates an ephemeral message destination routing interface that may be used in accordance with an embodiment of the invention.

The next operation of FIG. 2 is to accept destinations 212. As more fully described below, a destination may be used to identify intended recipients of a message or a location or "gallery" where one or more messages may be accessed. FIG. 3 illustrates an icon 306 to invoke a destination list. Haptic contact on the icon may result in a destination list of the type shown in FIG. 4. FIG. 4 illustrates an electronic device 100 displaying a destination list. The destination list may include a destination of "My Story" 402, where "My Story" is a reference to an ephemeral gallery of ephemeral messages. The destination list may also include a friends or contacts section 404 listing various friends that may be ephemeral message recipients. Haptic contact with a box 406 associated with a listed individual or story places the corresponding individual or story on a destination list.

Figure 6:
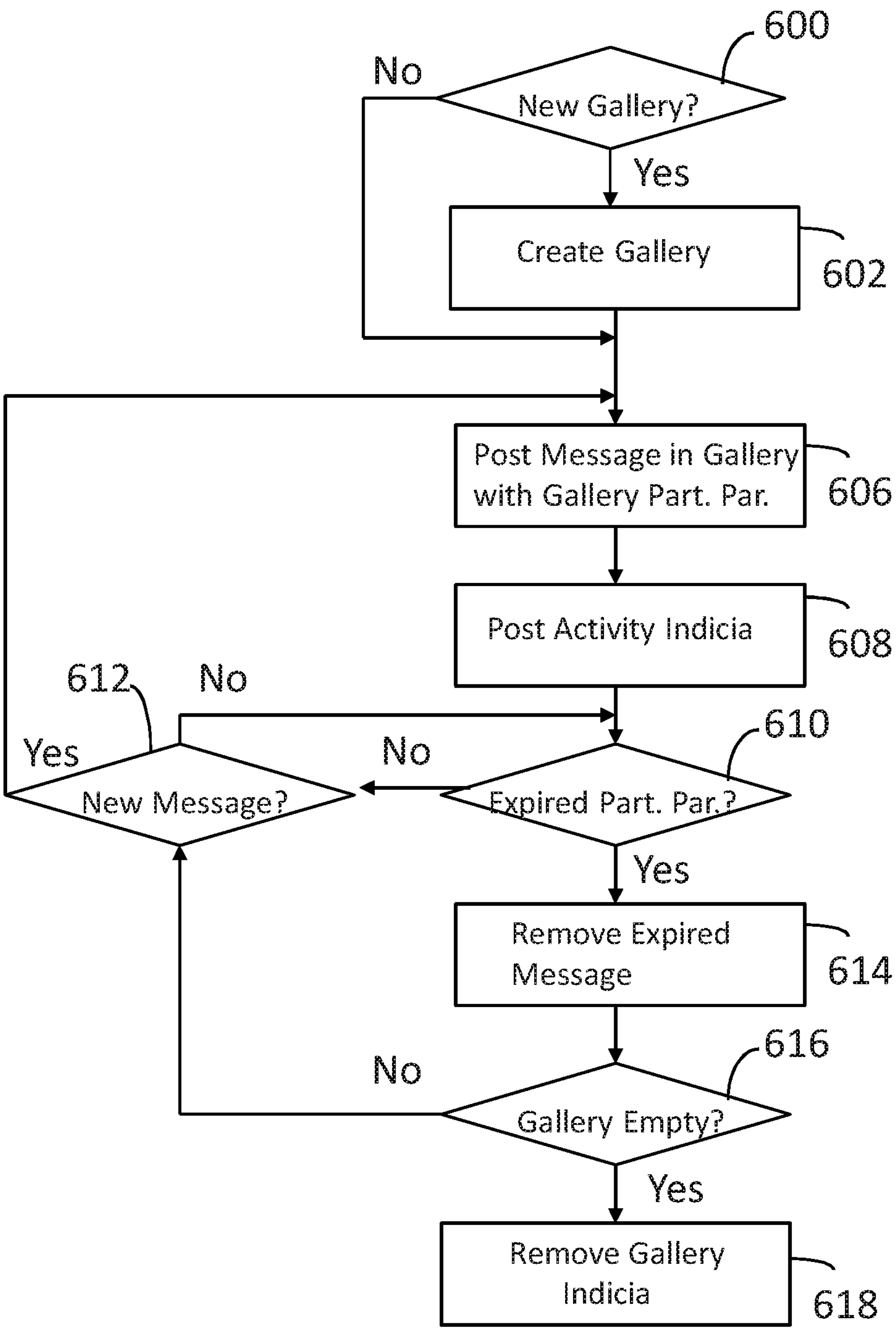
FIG. 6 illustrates ephemeral gallery processing operations associated with an embodiment of the invention.

Returning to FIG. 2, after the destination list is specified, the ephemeral message is sent to the specified destinations 214. For example, the ephemeral message is sent to friends selected from section 404, if any. A check is also made to determine whether the message should be posted to an ephemeral gallery 216. If not (216—No), processing is completed. If so (216—Yes), the processing of FIG. 6 is performed 220. Thus, it is possible to send a message to one or more friends and/or post to an ephemeral gallery.

Figure 5:
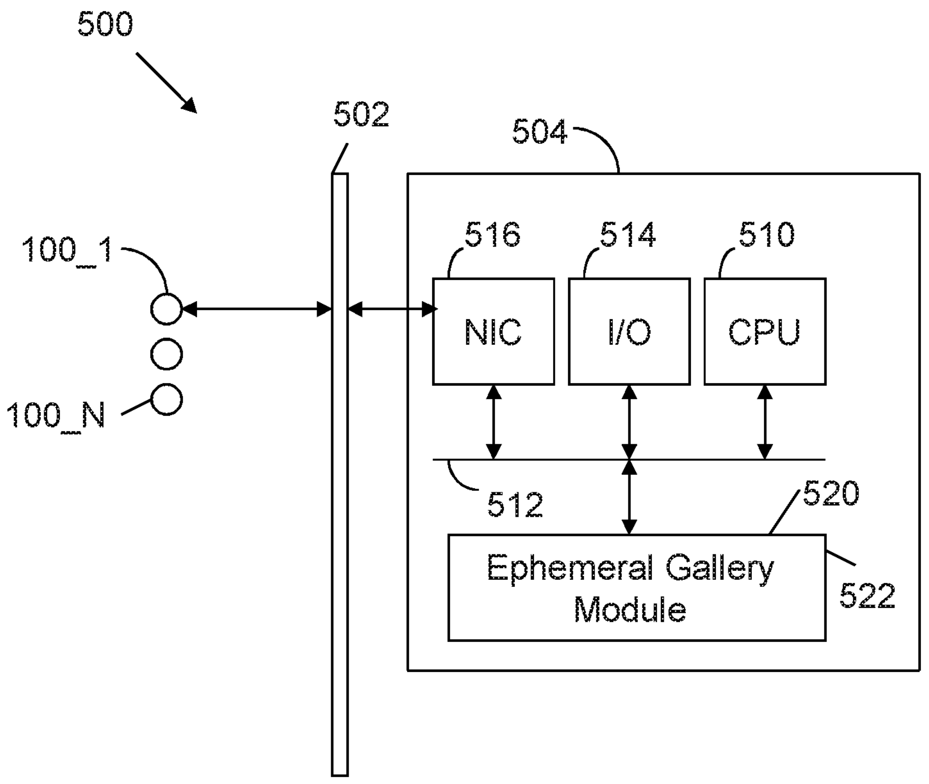
FIG. 5 illustrates a system to implement an embodiment of the invention.

FIG. 5 illustrates a system 500. The figure presents a simplified representation of a set of electronic devices 100_1 through 100_N, where each electronic device may be configured as the device of FIG. 1. Each electronic device is in communication with a network 502, which may be any combination of wireless and wired networks.

A server 504 is also connected to the network 502. The server 504 includes standard components, such as a central processing unit 510 connected to input/output devices 514 via a network 512. The input/output devices 514 may include a keyboard, mouse, display and the like. A network interface circuit 516 is also connected to the bus 512 to provide connectivity to network 502. A memory 520 is also connected to the bus 512. The memory 520 stores an ephemeral gallery module 522. The ephemeral gallery module 522 stores instructions executed by the central processing unit 510 to implement operations of the invention. For example, the ephemeral gallery module 522 may include instructions to coordinate the processing operations of FIG. 2. These operations may be controlled by the ephemeral gallery module 522 or they may be performed in conjunction with selective operations performed by the ephemeral message controller 106.

FIG. 6 illustrates ephemeral gallery module 522 operations performed in accordance with an embodiment of the invention. The first operation of FIG. 6 is to determine whether a new gallery is needed 600. As discussed in connection with FIG. 4, designating "My Story" 402 as a message recipient results in a post of an ephemeral message to an ephemeral gallery. If a gallery does not exist (600—Yes), then a new gallery is created 602. Alternately, if a gallery does exist and a user wants to create a new gallery, then the new gallery is created 602. The user may be supplied a prompt to indicate whether an existing gallery should be used or a new gallery should be designated.

The message is then posted in the gallery with a gallery participation parameter 606. The gallery participation parameter is an ephemeral period of time that the ephemeral message will continue to exist in the gallery. For example, a first ephemeral message posted to the gallery may have a default gallery participation parameter of 24 hours. In other instances, the gallery participation parameter may be set by a user. The gallery participation parameter value decreases with the passage of time. Thus, in this embodiment, an ephemeral message gallery subsists for as long as the gallery participation parameter of the last message posed to the gallery.

In another embodiment, a gallery timer may be assigned to a gallery by a user. The gallery timer may be used to establish a lifespan of an associated gallery and messages posted to this gallery subsist for no longer than the life of the gallery. Thus, in some embodiments, all messages posted to such a gallery will subsist for the duration of the life of the gallery (regardless of posting time). In other embodiments, messages may be submitted with a gallery participation parameter. In these embodiments, messages expire and become inaccessible at the earlier of the gallery participation parameter or the remaining life of the gallery.

The next processing operation of FIG. 6 is to post activity indicia 608. Examples of activity indicia are provided below. A check is then made to determine whether there is an expired participation parameter 610. If so (610—Yes), the ephemeral message associated with the expired participation parameter is removed from the ephemeral gallery 614. If as a result of this removed message the gallery is empty (616—Yes), then the ephemeral gallery terminates and indicia of the gallery is removed 618. If the gallery is not empty (616—No), a check is made for a new message 612. If a new message exists (612—Yes), then processing returns to block 604. If a new message does not exist (612—No), then processing returns to block 610. If an expired participation parameter does not exist (610—No), then a check is made once again for a new message 612.

FIG. 7 illustrates a data structure for an ephemeral message gallery. A first column 700 may have a list of messages. Another column 702 may have a list of message duration parameters for individual messages. Another column 704 may have a list of gallery participation parameters for individual messages. Observe in this example that the values in column 702 add up to 30 seconds. Thus, the ephemeral message gallery in this example has four messages that will take 30 seconds to display. Further observe that the oldest message (Message_1) is displayed first and will be removed in 120 minutes. In this example, the newest message (Message_4) will remain in the ephemeral gallery for 1320 minutes at which point the ephemeral gallery will expire, unless another message is posted. The arrival of a new message alters the gallery timer, but does not alter gallery participation parameters.

Figure 8:
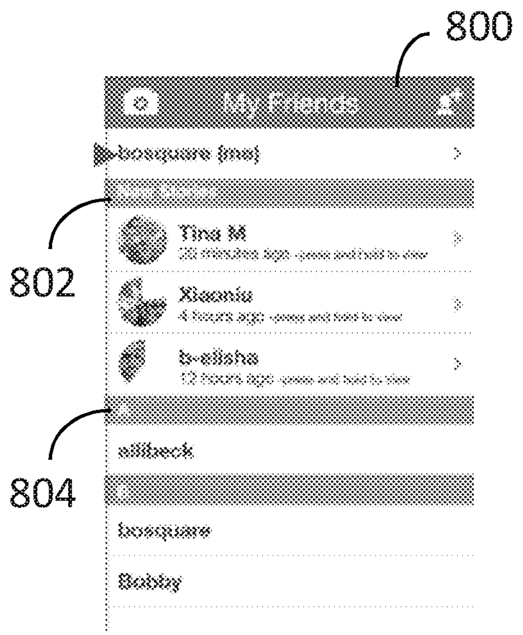
FIG. 8 illustrates ephemeral gallery indicia associated with an embodiment of the invention.

FIG. 8 illustrates an interface 800 with a section 802 that designates available ephemeral message galleries (stories) and a section 804 with a listing of friends (available destinations for an ephemeral message). Observe that section 802 has indicia of ephemeral message gallery activity. FIG. 8 provides example indicia of the time that the last message was posted to the ephemeral message gallery. FIG. 8 also provides example graphical indicia of the amount of time remaining for an ephemeral message gallery. Observe that the first entry was posted 20 minutes ago and therefore has a full circle indicative of the time remaining for that ephemeral message gallery. On the other hand, the third entry was posted 12 hours ago and has approximately half a circle to indicate the time remaining for that ephemeral message gallery. This example contemplates a 24 hour period for an ephemeral message gallery. Naturally, other time periods may be utilized in accordance with embodiments of the invention.

Figure 9:
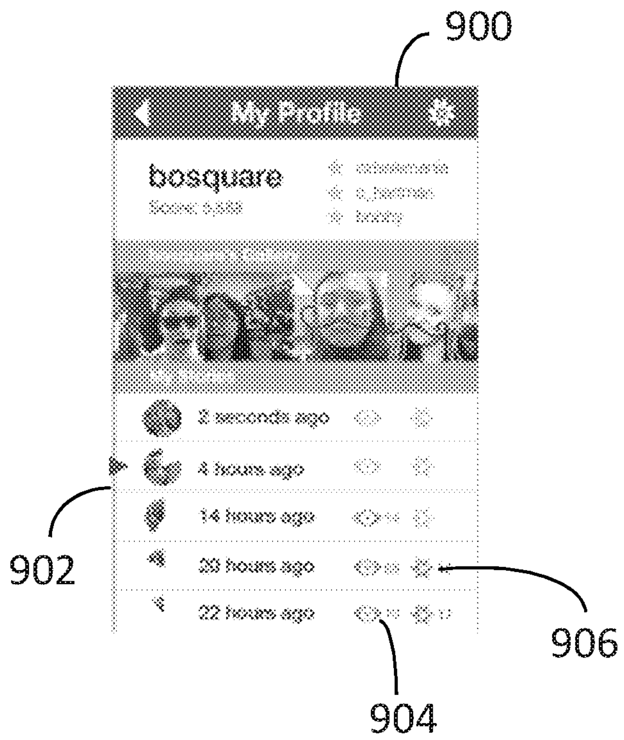
FIG. 9 illustrates ephemeral gallery indicia associated with another embodiment of the invention.

FIG. 9 illustrates an interface 900 with information on a user's stories. Individual stories 902 have indicia of the amount of time remaining. Indicia 904 of the number of ephemeral gallery views is also provided. Indicia 906 of screenshots taken of an ephemeral message is also provided. This information is significant since the intent of the message was that it be ephemeral. If a message recipient overrides this intent by taking a screen shot, then the message sender is advised.

Figure 10:
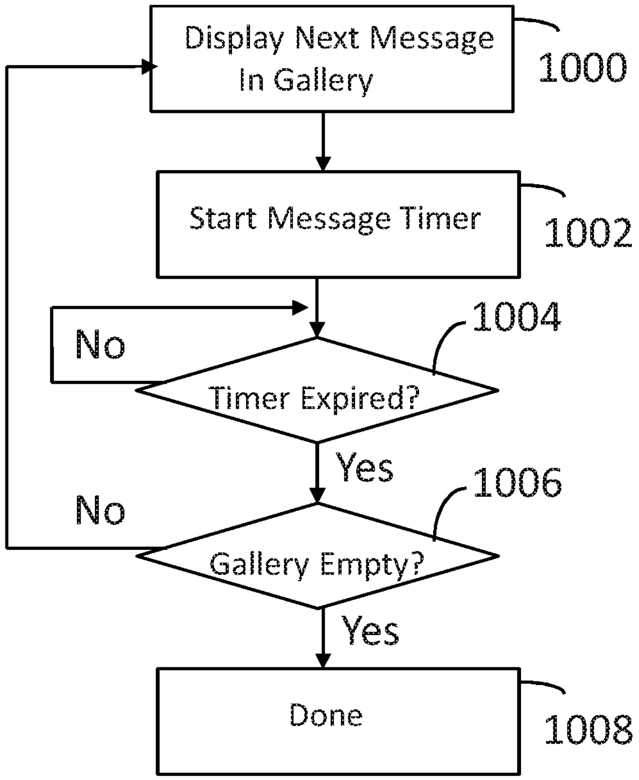
FIG. 10 illustrates operations performed in response to an ephemeral gallery view request.

FIG. 10 illustrates processing operations performed by the ephemeral gallery module 522 in response to a request for an ephemeral message gallery. As shown in FIG. 8, a user receives a list of 802 of available stories. Haptic contact with indicia of a story is operative as a request to view an ephemeral message gallery.

The first operation in FIG. 10 is to display the next message in the gallery 1000. In the example of FIG. 7, the oldest message is the first message to be displayed. A message timer is then started 1002. The message timer expires at the end of the message duration parameter for the displayed ephemeral message. In the example of FIG. 7, the first message (Message_1) is displayed for 10 seconds. Block 1004 checks for the timer to expire. Upon expiration of the timer (1004—Yes), a check is made to determine if the gallery is empty 1006. If so (1006—Yes), processing is completed 1008. If not (1006—No), processing returns to block 1000. This processing loop is repeated until the gallery is empty.

Figure 11:
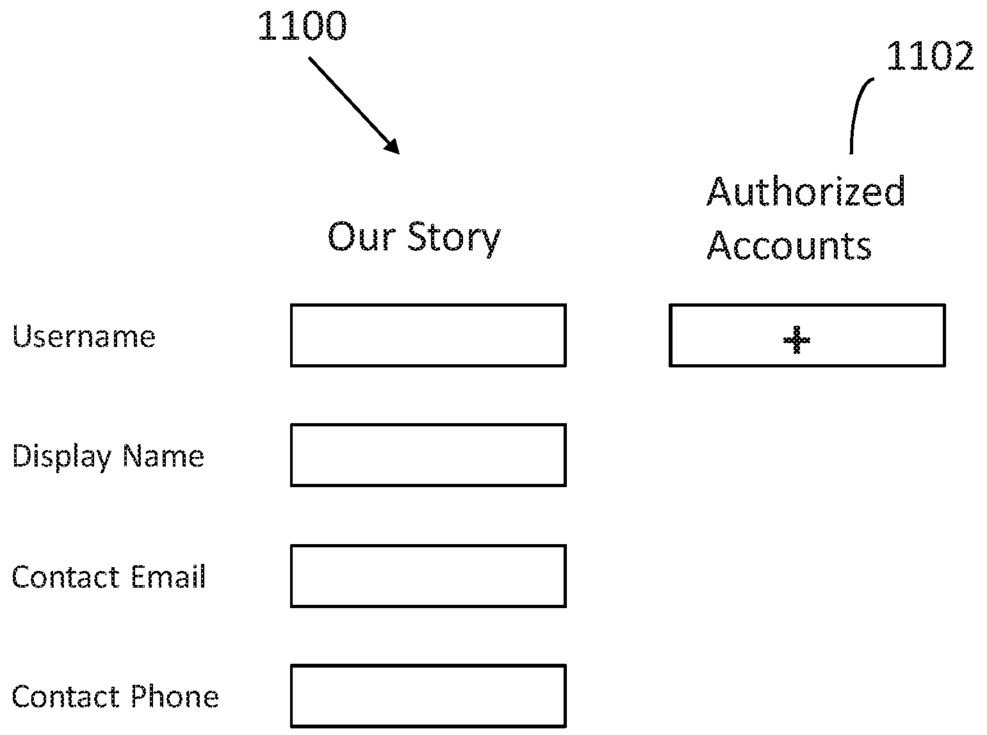
FIG. 11 illustrates an account administration interface to establish an ephemeral gallery that receives ephemeral messages from multiple users.

FIG. 11 illustrates an account administration interface 1100 to establish an ephemeral gallery that receives ephemeral messages from multiple users. Such a feature may be used to facilitate celebrity or organizational accounts where numerous authorized users are allowed to post on behalf of a single account. In one embodiment, a username, display name, contact email and contact phone are specified by an account administrator. An authorized accounts prompt 1102 allows the account administrator to add other users to the ephemeral gallery. For example, activation of the prompt 1102 may result in prompts for a username, display name, contact email and/or contact phone. Alternately, activation of the prompt 1102 may result in an interface of the type shown in FIG. 4 through which authorized accounts may be added.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A server, comprising:

at least one processor; and a memory storing instructions executed by the at least one processor to:

receive a plurality of messages from a user device, wherein each of the plurality of messages comprises at least one media content item;

post the plurality of messages as ephemeral messages to an ephemeral gallery, wherein the ephemeral gallery comprises a plurality of ephemeral messages posted for viewing by one or more recipients;

receive, from the user device, one or more additional destination selections for corresponding ones of the plurality of messages;

post the plurality of messages for which the one or more additional destination selections are received to at least one additional destination other than the ephemeral gallery, in each case as distinct instances from the ephemeral messages posted to the ephemeral gallery;

maintain, for each of the ephemeral messages posted to the ephemeral gallery, a gallery participation parameter that indicates a time value for continued availability of the corresponding ephemeral message in the ephemeral gallery;

responsive to receiving an ephemeral gallery view request from one of the one or more recipients, sequentially display the plurality of ephemeral messages on a recipient device corresponding to the ephemeral gallery view request; and remove, from the ephemeral gallery, any of the ephemeral messages for which respective gallery participation parameters have expired, wherein removed ones of the ephemeral messages are thereafter unavailable for recipient viewing as part of the ephemeral gallery, wherein the distinct instances of the plurality of messages posted to the at least one additional destination continue to be available after corresponding ones of the ephemeral messages are removed from the ephemeral gallery.

2. The server of claim 1, wherein the memory storing instructions executed by the at least one processor further includes instructions to create the ephemeral gallery at least partly in response to receiving at least one of the plurality of messages.

3. The server of claim 1, wherein the memory storing instructions executed by the at least one processor further includes instructions to receive, from the user device, a destination selection for each of the plurality of messages, the destination selection corresponding to the ephemeral gallery.

4. The server of claim 1, wherein the memory storing instructions executed by the at least one processor further includes instructions to maintain, for each of the ephemeral messages posted to the ephemeral gallery, an associated message duration parameter that indicates a display duration for the corresponding ephemeral message during viewing of the ephemeral gallery.

5. The server of claim 4, wherein the instructions to sequentially display the ephemeral messages on the recipient device corresponding to the ephemeral gallery view request comprise instructions for:

starting a message timer when display of one of the ephemeral messages is commenced, determining that the message timer expires when the message timer equals the corresponding display duration, and responsive to expiry of the message timer, displaying a next one of the ephemeral messages in the ephemeral gallery.

6. The server of claim 1, wherein the memory storing instructions executed by the at least one processor further includes instructions to eliminate the ephemeral gallery upon expiry of a gallery availability parameter, the ephemeral gallery being unavailable subsequent to elimination thereof.

7. The server of claim 1, wherein the memory storing instructions executed by the at least one processor further includes instructions to post indicia of ephemeral gallery activity.

8. The server of claim 7, wherein the indicia of ephemeral gallery activity includes indicia of a number of ephemeral gallery views.

9. The server of claim 1, wherein the memory storing instructions executed by the at least one processor further includes instructions to generate augmented messages by augmenting the at least one media content item of one or more of the plurality of messages with one or more of hand-drawn message content, a photograph filter, and a typed message.

10. The server of claim 9, wherein the memory storing instructions executed by the at least one processor further includes instructions to provide a drawing tool via the user device, the drawing tool being configured to enable user provision of hand-drawn message content in association with the respective at least one media content item.

11. The server of claim 1, wherein the memory storing instructions executed by the at least one processor further includes instructions to maintain a gallery timer that counts down a predefined time value with respect to the ephemeral gallery, the gallery timer being separate from the gallery participation parameters.

12. The server of claim 11, wherein the memory storing instructions executed by the at least one processor further includes instructions to remove the ephemeral gallery upon expiration of the gallery timer and/or expiration of all gallery participation parameters.

13. The server of claim 12, wherein the memory storing instructions executed by the at least one processor further includes instructions to preserve at least one media content item in the ephemeral gallery in response to receiving user input indicative of media content item preservation.

14. The server of claim 1, wherein the memory storing instructions executed by the at least one processor to post the plurality of messages for which the one or more additional destination selections are received to at least one additional destination comprises instructions to post one or more of the plurality of messages as ephemeral messages to an additional ephemeral gallery.

15. The server of claim 14, wherein the memory storing instructions executed by the at least one processor further includes instructions to maintain, for each of the plurality of messages posted as ephemeral messages to the additional ephemeral gallery, a second gallery participation parameter that indicates a second time value for continued availability of the corresponding ephemeral message in the additional ephemeral gallery.

16. The server of claim 15, wherein the memory storing instructions executed by the at least one processor further includes instructions to remove, from the additional ephemeral gallery, any of the corresponding ephemeral messages for which respective second gallery participation parameters have expired, wherein removed ones of the ephemeral messages are thereafter unavailable for recipient viewing as part of the additional ephemeral gallery.

17. The server of claim 16, wherein the memory storing instructions executed by the at least one processor further includes instructions to maintain a second gallery timer that counts down a second predefined time value with respect to the additional ephemeral gallery, the second gallery timer being separate from the second gallery participation parameters.

18. The server of claim 17, wherein the memory storing instructions executed by the at least one processor further includes instructions to remove the additional ephemeral gallery upon expiration of the second gallery timer and/or expiration of all second gallery participation parameters.

19. The server of claim 1, wherein the memory storing instructions executed by the at least one processor to post the plurality of messages for which the one or more additional destination selections are received to at least one additional destination comprises instructions to send one or more of the plurality of messages to at least one individual recipient device.

20. A computer-implemented method, comprising:
- receiving a plurality of messages from a user device, wherein each of the plurality of messages comprises at least one media content item;
- posting the plurality of messages as ephemeral messages to an ephemeral gallery, wherein the ephemeral gallery comprises a plurality of ephemeral messages posted for viewing by one or more recipients;
- receiving, from the user device, one or more additional destination selections for corresponding ones of the plurality of messages;
- posting the plurality of messages for which the one or more additional destination selections are received to at least one additional destination other than the ephemeral gallery, in each case as distinct instances from the ephemeral messages posted to the ephemeral gallery;
- maintaining, for each of the ephemeral messages posted to the ephemeral gallery, a gallery participation parameter that indicates a time value for continued availability of the corresponding ephemeral message in the ephemeral gallery;
- responsive to receiving an ephemeral gallery view request from one of the one or more recipients, sequentially displaying the plurality of ephemeral messages on a recipient device corresponding to the ephemeral gallery view request; and
- removing, from the ephemeral gallery, any of the ephemeral messages for which respective gallery participation parameters have expired, wherein removed ones of the ephemeral messages are thereafter unavailable for recipient viewing as part of the ephemeral gallery,
- wherein the distinct instances of the plurality of messages posted to the at least one additional destination continue to be available after corresponding ones of the ephemeral messages are removed from the ephemeral gallery.

21. The computer-implemented method of claim 20, further comprising:
- creating the ephemeral gallery at least partly in response to receiving at least one of the plurality of messages.

22. The computer-implemented method of claim 20, further comprising:
- receiving, from the user device, a destination selection for each of the plurality of messages, the destination selection corresponding to the ephemeral gallery.

23. The computer-implemented method of claim 20, further comprising:
- maintaining, for each of the ephemeral messages posted to the ephemeral gallery, an associated message duration parameter that indicates a display duration for the corresponding ephemeral message during viewing of the ephemeral gallery.

24. The computer-implemented method of claim 23, wherein sequentially displaying the ephemeral messages on the recipient device corresponding to the ephemeral gallery view request comprises:
- starting a message timer when display of one of the ephemeral messages is commenced,
- determining that the message timer expires when the message timer equals the corresponding display duration, and
- responsive to expiry of the message timer, displaying a next one of the ephemeral messages in the ephemeral gallery.

25. The computer-implemented method of claim 20, further comprising:
- eliminating the ephemeral gallery upon expiry of a gallery availability parameter, the ephemeral gallery being unavailable subsequent to elimination thereof.

26. The computer-implemented method of claim 20, further comprising:
- posting indicia of ephemeral gallery activity,
- wherein the indicia of ephemeral gallery activity includes indicia of a number of ephemeral gallery views.

27. The computer-implemented method of claim 20, further comprising:
- generating augmented messages by augmenting the at least one media content item of one or more of the plurality of messages with one or more of hand-drawn message content, a photograph filter, and a typed message.

28. The computer-implemented method of claim 20, further comprising:
- maintaining a gallery timer that counts down a predefined time value with respect to the ephemeral gallery, the gallery timer being separate from the gallery participation parameters; and
- removing the ephemeral gallery upon expiration of the gallery timer and/or expiration of all gallery participation parameters.

29. The computer-implemented method of claim 28, further comprising:
- preserving at least one media content item in the ephemeral gallery in response to receiving user input indicative of media content item preservation.

30. A non-transitory computer-readable storage medium, the computer-readable storage medium including instructions that when executed by a computer, cause the computer to perform operations comprising:
- receiving a plurality of messages from a user device, wherein each of the plurality of messages comprises at least one media content item;
- posting the plurality of messages as ephemeral messages to an ephemeral gallery, wherein the ephemeral gallery comprises a plurality of ephemeral messages posted for viewing by one or more recipients;
- receiving, from the user device, one or more additional destination selections for corresponding ones of the plurality of messages;
- posting the plurality of messages for which the one or more additional destination selections are received to at least one additional destination other than the ephemeral gallery, in each case as distinct instances from the ephemeral messages posted to the ephemeral gallery;
- maintaining, for each of the ephemeral messages posted to the ephemeral gallery, a gallery participation parameter that indicates a time value for continued availability of the corresponding ephemeral message in the ephemeral gallery;
- responsive to receiving an ephemeral gallery view request from one of the one or more recipients, sequentially displaying the plurality of ephemeral messages on a recipient device corresponding to the ephemeral gallery view request; and
- removing, from the ephemeral gallery, any of the ephemeral messages for which respective gallery participation parameters have expired, wherein removed ones of the ephemeral messages are thereafter unavailable for recipient viewing as part of the ephemeral gallery,
- wherein the distinct instances of the plurality of messages posted to the at least one additional destination continue to be available after corresponding ones of the ephemeral messages are removed from the ephemeral gallery.

* * * * *